US009396412B2

(12) United States Patent
Kuo et al.

(10) Patent No.: US 9,396,412 B2
(45) Date of Patent: Jul. 19, 2016

(54) MACHINE-LEARNT PERSON RE-IDENTIFICATION (71) Applicants: Cheng-Hao Kuo, Plainsboro, NJ (US); Vinay Damodar Shet, Princeton, NJ (US); Sameh Khamis, College Park, MD (US)

(72) Inventors: Cheng-Hao Kuo, Plainsboro, NJ (US); Vinay Damodar Shet, Princeton, NJ (US); Sameh Khamis, College Park, MD (US)

(73) Assignees: Siemens Aktiengesellschaft, Munich (DE); University of Maryland, College Park, MD (US)

( * ) Notice: Subject to any disclaimer, the term of this patent is extended or adjusted under 35 U.S.C. 154(b) by 335 days.

(21) Appl. No.: 13/913,685

(22) Filed: Jun. 10, 2013

(65) Prior Publication Data

US 2013/0343642 A1     Dec. 26, 2013

Related U.S. Application Data (60) Provisional application No. 61/662,588, filed on Jun. 21, 2012, provisional application No. 61/724,537, filed on Nov. 9, 2012.

(51) Int. Cl.
*G06K 9/62* (2006.01)
*G06K 9/46* (2006.01)

(52) U.S. Cl.
CPC ............ *G06K 9/6256* (2013.01); *G06K 9/4652* (2013.01)

(58) Field of Classification Search
None
See application file for complete search history.

(56) References Cited

U.S. PATENT DOCUMENTS

2002/0186882 A1* 12/2002 Cotman ............. G06K 9/00127
                                                        382/165
2007/0254307 A1* 11/2007 Kita ........................ G06F 19/16
                                                        435/7.1

FOREIGN PATENT DOCUMENTS

JP    WO 2013088665 A1 *  6/2013    ............ G06T 7/0081

OTHER PUBLICATIONS

Wei-Shi Zheng; Shaogang Gong; Tao Xiang, "Reidentification by Relative Distance Comparison," Pattern Analysis and Machine Intelligence, IEEE Transactions on , vol. 35, No. 3, pp. 653,668, Mar. 2013.*
Zheng, Wei-Shi, et al: "Reidentification by Relative Distance Comparison," IEEE Transacations on Pattern Analysis and Machine Intelligence, vol. 35, No. 3, pp. 653-668, Jun. 20, 2012.
B. Prosser et al., "Person Re-Identification by Support Vector Ranking," In: Proceedings of British Machine Vision Conference (BMVC), Jan. 1, 2010, pp. 21.1-21.11.
M. Hirzer et al., "Person Re-identification by Descriptive and Discriminative Classification," In Field Programmable Logic and Application, Jan. 1, 2011, vol. 6688, pp. 91-102.

(Continued)

*Primary Examiner* — Stephen R Koziol
*Assistant Examiner* — Amandeep Saini (57) ABSTRACT Automated person re-identification may be assisted by consideration of attributes of the person in a joint classification with matching of the person. By both solving for similarities in a plurality of attributes and identities, discriminative interactions may be captured. Automated person re-identification may be assisted by consideration of a semantic color name. Rather than a color histogram, probability distributions are mapped to color terms of the semantic color name. Using other descriptors as well, similarity measures for the various descriptors are weighted and combined into a score. Either or both considerations may be used.

14 Claims, 2 Drawing Sheets (56) References Cited

OTHER PUBLICATIONS

Li et al., "Learning to associate: HybridBoosted Multi-target tracker for crowded scene", 2009 IEEE Conf. on Computer Vision and Pattern Recognition, Miami, FL, Jun. 20-25, 2009, pp. 2953-2960.
Int'l Search Report dated Oct. 25, 2013.
O. Javed et al., "Appearance Modeling for Tracking in Multiple Non-overlapping Cameras," In CVPR, pp. 1-8, 2005.
M. Hirzer et al., "Person Re-identification by Descriptive and Discriminative Classification," In SCIA, pp. 1-12, 2011.
W.-S. Zheng et al., "Person Re-identification by Probabilistic Relative Distance Comparison," In CVPR, pp. 649-656, 2011.
N. Gheissari et al., "Person Reidentification Using Spatiotemporal Appearance," in CVPR, pp. 1-8, 2006.
Anonymous ECCV Submission, "Describing Clothing by Semantic Attributes," pp. 1-14, 2012.
K-W Chen et al., "An Adaptive Learning Method for Target Tracking across Multiple Cameras," In: Proceedings of Computer Vision and Pattern Recognition (CVPR), pp. 1-8, 2008.
D.S. Cheng et al., "Custom Pictorial Structures for Re-identification," In: Proceedings of British Machine Vision Conference (BMVC), pp. 1-11, 2008.
J. van de Weijer et al., "Applying Color Names to Image Description," In: Proceedings of Computer Vision and Pattern Recognition (CVPR), pp. 1-4, 2007.
S. Bak et al., "Person Re-identification Using Spatial Covariance Regions of Human Body Parts," In: Proceedings of International Conference on Advanced Video and Signal-Based Surveillance (AVSS), pp. 1-6, 2010.
M. Farenzena et al., "Person Re-Identification by Symmetry-Driven Accumulation of Local Features," In: Proceedings of Computer Vision and Pattern Recognition (CVPR), pp. 1-8, 2010.
N. Dalal et al., "Histograms of Oriented Gradients for Human Detection," In: Proceedings of Computer Vision and Pattern Recognition (CVPR), pp. 1-8, 2005.
A.R. Dick et al., "A Stochastic Approach to Tracking Objects Across Multiple Cameras," In: Australian Conference on Artificial Intelligence, pp. 160-170, 2004.
D. Gray et al., "Viewpoint Invariant Pedestrian Recognition with an Ensemble of Localized Features," In: Proceedings of European Conference on Computer Vision (ECCV), pp. 1-14, 2008.
A. Gilbert et al., "Tracking objects across cameras by incrementally learning inter-camera colour calibration and patterns of activity," In: Proceedings of European Conference on Computer Vision (ECCV), pp. 1-12, 2006.
O. Javed et al., "Tracking Across Multiple Cameras With Disjoint Views," In: Proceedings of International Conference on Computer Vision (ICCV), pp. 1-6, 2003.
D. Gray et al., "Evaluating Appearance Models for Recognition, Reacquisition, and Tracking," In: Proceedings of International Workshop on Performance Evaluation of Tracking and Surveillance (PETS), pp. 1-7, 2007.
C.H. Kuo et al., "Inter-camera Association of Multi-target Tracks by On-Line Learned Appearance Affinity Models," In: ECCV, pp. 383-396, 2010.
T. Lan et al., "Image Retrieval with Structured Object Queries Using Latent Ranking SVM," In: European Conference on Computer Vision, pp. 1-14, 2012.
R. Layne et al., "Person Re-identification by Attributes," In: BMVC, pp. 1-11, 2012.
D. Makris et al., "Bridging the Gaps between Cameras," In: CVRP, pp. 1-6, 2004.
F. Porikli, "Inter-Camera Color Calibration by Correlation Model Function," In: Proceedings of International Conference on Image Processing (ICIP), pp. 1-6, 2003.
B. Prosser et al., "Multi-camera Matching using Bi-Directional Cumulative Brightness Transfer Functions," In: BMVC, pp. 1-10, 2008.
W.R. Schwartz et al., "Learning Discriminative Appearance-Based Models Using Partial Least Squares," In: SIB-GRAPI, pp. 1-8, 2009.
B. Prosser et al., "Person Re-Identification by Support Vector Ranking," In: Proceedings of British Machine Vision Conference (BMVC), pp. 1-11, 2010.
X. Wang et al., "Shape and Appearance Context Modeling," In: Proceedings of International Conference on Computer Vision (ICCV), pp. 1-8, 2007.
J. van de Weijer et al., "Learning Color Names from Real-World Images," Learning color names from real-world images, In: Proceedings of Computer Vision and Pattern Recognition (CVPR), pp. 1-8, 2007.

* cited by examiner

MACHINE-LEARNT PERSON RE-IDENTIFICATION

RELATED APPLICATIONS

The present patent document claims the benefit of the filing dates under 35 U.S.C. §119(e) of Provisional U.S. Patent Application Ser. Nos. 61/662,588, filed Jun. 21, 2012, and 61/724,537, filed Nov. 9, 2012, which are hereby incorporated by reference.

BACKGROUND

The present embodiments relate to person re-identification in a video system. In particular, a person in one image is identified as also being in another image.

Person re-identification is a challenging problem. For this inter-camera association or multi-camera tracking, people are matched across different, usually non-overlapping, camera fields of view. Matching is complicated by variations in lighting conditions, camera viewpoints, backgrounds, and human poses. In public spaces, face recognition and other fine biometric cues may not be available because of low image resolution and/or distance.

It can be quite challenging even for a human to match two images of a same person from among images of many people. Re-identification approaches may be divided by two categories: a) non-learning based (direct) methods, and b) learning-based methods. The direct methods usually extract a set of hand-crafted descriptive representations and combine their corresponding distance measurements without learning. On the other hand, learning-based methods usually extract a bunch of low-level descriptors, concatenate them into a long feature vector, and obtain discriminability by labeled training samples and machine learning techniques.

Two cues, the spatio-temporal information and target appearance, may be fused for re-identification. The spatio-temporal cue may be learned. For the appearance cue, color information and learnt brightness transfer functions (BTFs) or color calibration handle the changing lighting conditions in different cameras. Distinct people may look similar if they wear clothes with the same color, which in turn increases the difficulties of finding correct associations. Appearance-based re-identification relies on the information provided by the visual appearance of human body and clothing. The targets of interest do not change their clothes in different cameras. However, this is a challenging problem since human appearance usually exhibits large variations across different cameras. These processor implemented appearance-based models tend to suffer in light of lighting and pose changes.

Many approaches address this problem mainly by two important elements: descriptor extraction and similarity/distance measurements. For descriptor extraction, the goal is to find the invariant and distinctive representation to describe a person image. Several descriptors have been used, which include color histogram, histogram of oriented gradients (HOG), texture filters, Maximally Stable Color Regions (MSCR), and decomposable triangulated model. For similarity/distance measures, standard distance measurement (e.g., Bhattacharyya distance, correlation coefficient, L1-Norm, or L2-Norm) are used. Among these descriptor and similarity measurements, the color histogram followed by Bhattacharyya distance are most widely used since the color information may be an important cue. However, the performance of color histogram in any color space is still not satisfactory.

SUMMARY

Systems, methods, and computer readable media are provided for person re-identification. Automated re-identification may be assisted by consideration of attributes of the person in a joint classification with matching of the person. By both solving for similarities in a plurality of attributes and identities, discriminative interactions may be captured. Automated re-identification may be assisted by consideration of a semantic color name. Rather than a color histogram, probability distributions are mapped to color terms of the semantic color name. Using other descriptors as well, similarity measures for the various descriptors are weighted and combined into a score. The considerations may be used separately or together.

In a first aspect, a method is provided for person re-identification. Color values are mapped from first and second images to first and second probability distributions over a plurality of colors. The plurality of colors is in a first color space different than a second color space of the color values. A processor calculates a similarity between the first and second probability distributions. An affinity score is determined as a function of the similarity and a weight. The weight is a rank-boosted machine-learnt value. A person is identified in the second image as a person in the first image. The identifying is a function of the affinity score.

In a second aspect, a non-transitory computer readable storage medium has stored therein data representing instructions executable by a programmed processor for person re-identification. The storage medium includes instructions for obtaining a first image representing a person and at least a second image, computing probability distributions of a semantic color name of the first and second images, determining image descriptors of the first image and second image in addition to the probability distributions, calculating similarity scores of the probability distributions and the image descriptors, combining the similarity scores as a function of rank-boosting weights, and re-identifying the person in the second image as a function of the combination of the similarity scores.

In a third aspect, a non-transitory computer readable storage medium has stored therein data representing instructions executable by a programmed processor for person re-identification. The storage medium includes instructions for extracting a plurality of features from first and second images, and jointly classifying a person represented in the first image as the person represented in the second image. The jointly classifying comprises applying a machine-learnt classifier configured for classifying a plurality of attributes of appearance of the person as a function of the features, matching the attributes of the first image with the second image, and classifying as a function of the matching of the attributes.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

In one approach, person re-identification uses semantic color name and machine-learnt weighting. In another approach, joint learning is used for attribute-consistent person re-identification. Either approach is used alone, or the approaches are used in combination. For combination, the semantic color name and corresponding weighting are incorporated as image descriptors in the joint learning. Other combinations may be provided. Below, the approaches are discussed together with reference to FIG. 1 and separately with reference to FIGS. 3 and 4.

Semantic color naming is used to describe a person image. A probability distribution of basic color terms of the semantic color name is computed as an image descriptor. To be better combined with other features, the appearance affinity model is defined as a linear combination of similarity measurements of corresponding local descriptors, such as the similarity in the probability distributions and similarities in other image descriptors. The RankBoost or other machine learning algorithm finds the optimal weights for the similarity measurements.

In one embodiment, the semantic color name includes color terms for: black, blue, brown, grey, green, orange, pink, purple, red, white, and yellow. Given the mapping from red, green, blue (RGB) values to probability distribution over those color names, a semantic histogram is built as an image descriptor. The semantic histogram is used for matching a pair of persons or searching a target in a semantic manner like "finding a person wearing red shirts and blue pants." Other image descriptors may include a color histogram, texture histogram, and covariance matrix.

The image descriptors are combined with an appearance-based affinity model. The appearance-based affinity model is a linear combination of similarity measurements of local descriptors. Rather than using a long raw vector with absolute differences as the feature pool, the similarity measurements are used. The corresponding weight for each similarity measurement is learned by the RankBoost algorithm. The image descriptors need not lie in Euclidean space. Over fitting may be handled better than when working on a raw difference vector. The weights clearly indicate the importance of the corresponding local image descriptors.

In another embodiment, attributes and joint classification are used with or instead of semantic color name. Attribute consistent joint learning goes beyond appearance and integrates a semantic aspect. The semantic representation is based on the types of attributes that humans might use in describing appearance (e.g., short sleeves, plain shirt, blue jeans, carrying bag, and/or gender). The semantic representation introduces some invariance to the lighting and pose conditions that impede models that rely only on appearance.

Attribute learning and matching is coupled in a joint learning framework using a probabilistic model, effectively leveraging the interaction between attributes and appearance. Both tasks are jointly learned in a unified framework using a probabilistic model. The attribute representation may be coupled with other measures, such as appearance-based matching.

Figure 1:
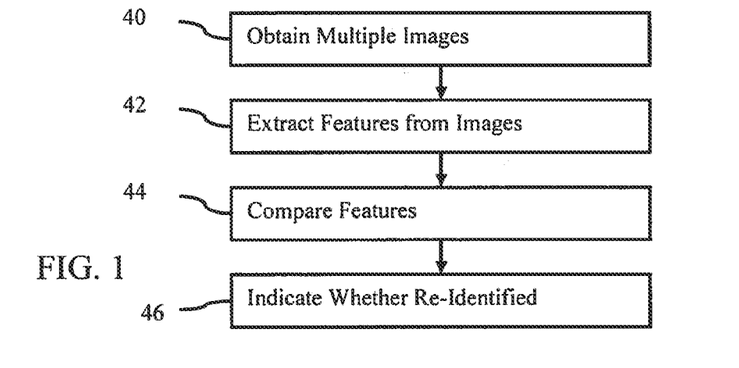
FIG. 1 is a flow chart diagram of one embodiment of a method for person re-identification.
Figure 3:
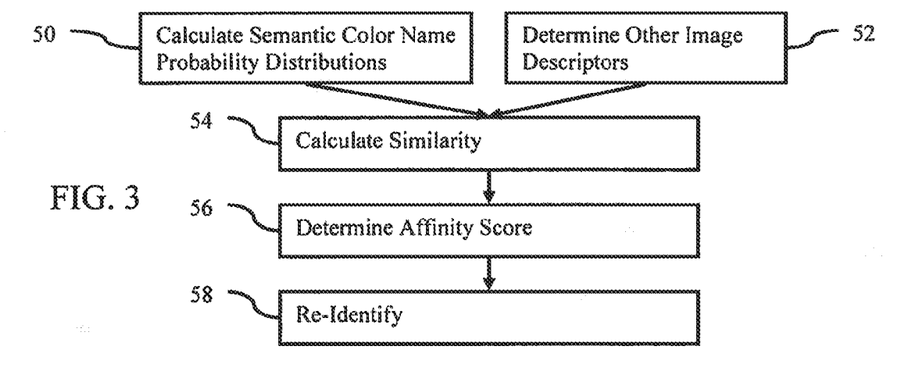
FIG. 3 is a flow chart diagram of one embodiment of a method for person re-identification using semantic color name.
Figure 4:
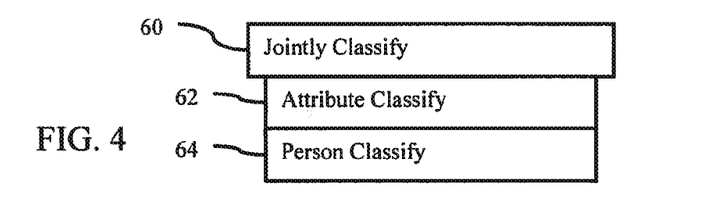
FIG. 4 is a flow chart diagram of one embodiment of a method for person re-identification using joint classification of attributes and identity.

FIGS. 1, 3, and 4 show methods for person re-identification. The methods are implemented by the system of FIG. 6, a processor, a computer, or another system. A processor implements all or some of the acts. For example, a user selects files or a processor automatically acquires files of images for re-identification in act 40 of FIG. 1.

The method is provided in the order shown, but other orders may be provided. Acts 50 and 52 are performed in any order or simultaneously. Acts 62 and 64 are performed as part of act 60, but may be performed sequentially in the order shown or simultaneously. Additional, different or fewer acts may be provided. For example, act 42 is not provided as the features used are the image intensities and/or color values such that further extraction is not needed.

Referring to FIG. 1, images are obtained. The images are obtained from cameras or other video devices. Images may be obtained in various manners, such as transfer over a wired or wireless network, loading from memory, direct feed, or other access to the images.

Figure 2:
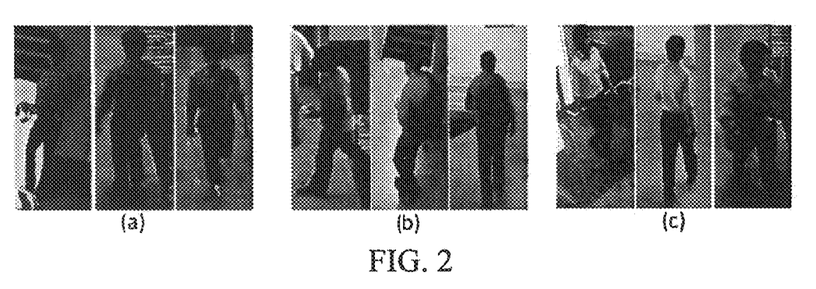
FIG. 2 shows three example groups of images of a same person as viewed by different cameras.

The images are from different cameras and/or a same camera at different times. The obtained images represent one or more people in a field of view of the respective camera. As a person traverses through a video surveyed region, typically along a common travel path, different cameras or the same camera at a different time capture the same person. For example, FIG. 2 shows three examples a, b, and c of a same person captured at different times and/or by different cameras. FIG. 2(a) shows a person having attributes of male, short brown hair, short sleeves, long pants, checkered grey top, and black pants. FIG. 2(b) shows a person having attributes of male, short black hair, short sleeves, long pants, plain green top, and blue pants. FIG. 2(c) shows a person having attributes of male, short black hair, short sleeves, long pants, plain grey top, and black pants.

The images are generally from a same period, such as within minutes or hours of each other. The period covers a time in which a person is likely wearing the same clothing and/or in which the person is within the surveyed region. Longer or shorter periods may be used, such as re-identifying a same person that has returned to a surveyed region hours, days, or weeks later.

The images may or may not be of a same person. For example, an airport video surveillance system may capture images of hundreds or thousands of different people. One image may include no, one, or many people. One of the many people may be a same person as was captured in a different image, or none of the many people in an image may be the same person.

The images may be of a region or may be cropped. For matching, a rectangular box fit to just surround a person may be used. Any people in the image of the region are cropped so that the resulting person image represents, at least mostly, just one person. An outline cropping may be used, such as where the general border of a person or the specific person is detected and cropped. Other image processing to the image of the region and/or to images of individuals may be used, such as low pass, high pass, band pass, directional, or other filtering.

In act 42, features are extracted from the images. For re-identification of one person from an image as being the person in another image, features are used. The same features are extracted from all of the images to be compared. For example, a person of interest is identified in an image. Any or every person may be a person of interest or a specific person may be selected. The features from the image of the person of interest are extracted. Features from images that may also include the person of interest are also extracted to determine whether the person has been re-identified.

Features include the image data itself or information derived from the image. Example features include pixel data, gradients, Haar wavelets, steerable features, directionally filtered data, averages, modes, medians, other statistical information, determined attributes, or other results from image processing. Information from other sources, such as a time stamp or time of acquisition, height, weight, or other characteristic of the person of interest, expected travel path, or video surveillance system may be used. The features have any format, such as a value, field of values, map, histogram, contours, shape, fit, correlation, or ratio.

Any number of features may be extracted, such as a few, tens, hundreds, thousands, or more. For example, about one hundred features are extracted.

The features are extracted from the entire image of the person or from sub-regions. For example, the image of a person is divided into six equally spaced horizontal regions. Vertical or other combination of sub-regions may be used. For images of only a part of a person (e.g., no legs viewable in the image), fewer regions may be used. The regions may be unequal, such as to isolate information in a particular body region. For example, the regions are sized to isolate information for the head, upper torso, lower torso, upper leg, and lower leg of a human body.

In one embodiment, gradient features are extracted for six regions. Each image is first split into six horizontal boxes. Color (e.g., RGB and LAB) information and texture information are collected in 16-bin histograms from each box. A filter bank of twenty-one Schmid and Gabor filters is used to extract the texture values. Histograms of gradient (HOG) features are collected at two different scales (e.g., coarse and fine). Histograms of color features in probability distributions of a semantic color name are collected. In another embodiment, color histogram, texture histogram, and HOG features are extracted for the six regions.

In act 44, the features are compared. A similarity, difference, correlation, ratio or other comparison is used. The comparison uses logic, fuzzy logic, machine-learnt classifiers, a programmed function, and/or other comparison approach. The comparison is used to determine the level of similarity. Any scale may be used, such as binary or over a range (e.g., a range of one hundred values of similarity).

In act 46, the person is re-identified. If the comparison indicates the same person, the person is re-identified. Sufficient similarity may be determined by a threshold or thresholds applied to the results of the comparison or comparisons. Any process to determine whether or not a person in one image is the same person as in another image may be used.

FIGS. 3 and 4 show two examples of specific implementation of re-identification. Different, the same, or overlapping feature sets are used with a machine-learnt classifier or classifiers to compare and re-identify.

FIG. 3 represents matching two person images with semantic color name descriptor extraction and affinity computation. The descriptors are an ensemble of local features extracted in given support regions (e.g., 6 horizontal stripes). Local image descriptors and similarity measurements are used to establish an appearance model for affinity computation.

A local descriptor d includes a feature channel $\lambda$ and a support region r. Given an image sample I, a single descriptor $d_{i,j}$ extracted over $r_j$ via $\lambda_i$ is denoted as:

$$d_{i,j} = I(\lambda_i, r_j) \quad (3)$$

where i and j are the indices of the feature channel $\lambda$ and the support region r (i.e., sub-region), respectively.

In acts 50 and 52, features are extracted. Act 50 may be provided without act 52, such as where only semantic color name features are used for comparison and re-identification.

In act 50, probability distributions of a semantic color name are computed. A probability distribution is computed for each of the images to be compared. Where the images are divided into sub-regions, a probability distribution is computed for each of the sub-regions of each of the images.

The probability distributions are mapped from the color values of the image. The image are in YUV, RGB, or other color space. For example, each pixel of the image has a R, G, and B value. Together, the RGB values represent a specific color. This color information is mapped to a probability distribution in a different color space. The mapped distribution is the semantic color name for the image or sub-region. The probability distribution represents a probability of the RGB values defining a color that matches a color term of the other space (i.e., a color term of the semantic color name).

The color terms of the semantic color space are commonly used colors. Any number may be used, such as four or more. In one example, eleven different colors are used. Alternatively or additionally, the color terms are not subsumable into each other. For choosing appropriate color names, basic color terms are defined. A basic color term of a language is not subsumable to other basic color terms and/or extensively used in different languages. For example, eleven basic color terms in English language are: black, blue, brown, grey, green, orange, pink, purple, red, white, and yellow. Other color terms may be used. Instead of using a simple color histogram from the image color space only, the semantic color name is used to describe a person image.

To use color naming as an image descriptor, the RGB values of an image pixel are mapped to the color names. Instead of one-to-one matching, a probability distribution over the color names is used since a certain value in RGB space may be assigned to multiple color names. For example, given RGB values may indicate a probability of black of 75%, a probability of blue of 20% and a probability of grey of 5%. This mapping is represented as:

$$f: x_{RGB} \rightarrow v \quad (1)$$

where v is an eleven element vector, and each element $v_i = P(c_i | x_{RGB})$ is the probability of the RGB values being assigned to a specific color name $c_i$.

A probability is provided for each color term. One or more of the probabilities may be zero. One, more, or all of the probabilities may be greater than zero and less than one or one hundred percent. One probability may be one or one hundred percent (e.g., all pixels are white or identical to a given color term so the other color terms have a probability of zero). A probability is assigned to each of the color terms for the region.

The color name descriptor, $K_R$, of region R is the summation of probability distributions from the pixels inside the region R:

$$K_R = (1/N) \Sigma_i f(x_{RGB}) \text{ of } x \text{ in the set of } R \quad (2)$$

where N is the number of pixels in the region. The probabilities for a given color name in a region are averaged or summed, but other functions may be used. The color may be filtered prior to mapping. The probabilities may be filtered prior to summation. For the region, the average probabilities for each color term are determined, resulting in a histogram across the eleven or other number of color terms.

The mapping from RGB value to probability distribution over eleven color names is a non-trivial problem. A look-up table is used for the mapping. The look-up table is manually created or machine learned. For example, manually annotated images with hand-segmented regions corresponding to the color label are used for machine learning. The mapping is inferred by Bayes Law assuming the prior probabilities are equal among all color names. In one embodiment, a 16×16×16 look-up table generated by learning the color names using a PLSA model is used. The three dimensions of the look-up table are for the R, G, and B values down sampled to a range of sixteen possible input values. Greater or lesser ranges may be used. In one embodiment, a publically available or published look-up table is used. Other look-up tables derived in a same or different manner may be used. Post processing may be used to alter or change results. For example, one or more probabilities may be assigned a zero value.

The color name probability distribution is an eleven dimensional vector in the form of the histogram. Other numbers of dimensions may be used. Each dimension is a probability value for one of the color terms. This feature is determined for each sub-region. Different regions of the image are mapped separately or have their own feature vector for the semantic color name. One or more color name probability distributions are provided for each image.

In act 52, other image descriptors than the semantic color name are determined. In addition to the probability distributions, other features are extracted. Any of various features may be used. In one embodiment, a color histogram, texture histogram, and/or covariance matrix features are determined for each image or sub-region.

For the color histograms, RGB, HSV, and YCbCr color spaces are used. Each channel of each color space forms a sixteen dimensional vector. For example, a histogram of the red values in a sub-region is determined where the histogram includes sixteen bins or ranges of values. Greater or lesser color resolution may be used. Fewer, different, or additional color spaces may be used. Any color histogram approach may be used.

For the texture histogram, Gabor and Schmid texture filtering with twenty one or other number of different parameters in total are applied to the luminance channel. The responses from each texture filter form a sixteen or other dimensional vector. Other texture histogramming may be used.

For the covariance matrix, the feature set includes spatial, color, and gradient information. Additional, different, or less information may be used. The covariance matrix takes the following form:

$$C_R = (1/(n-1))\Sigma^n_{k=1}(z_k-\mu)(z_k-\mu)^T \qquad (4)$$

$$\text{where } z_k = [(\delta I/\delta x)(\delta I/\delta y)(\delta^2 I/\delta x^2)(\delta^2 I/\delta^2)(\delta^2 I/\delta xy)] \qquad (5)$$

is the vector containing first and second derivatives of the image at the k-th pixel in the Region R, $\mu$ is the mean vector over R, and n is the number of pixels. Other covariance matrix calculations may be used.

In act 54, a similarity of the image descriptors is calculated. The similarities between images of the probability distributions of the semantic color name and of any other extracted features are determined. The similarity is a score representing how close the feature from one image is to the same type of feature from another image. The pair-wise similarity measurement from a specific feature over a specific region is computed (e.g., semantic color names for the torso regions of two images are compared). The similarity is of the same sub-region, but may be a comparison of a feature from one sub-region to the same feature of a different sub-region of another image.

The similarity between probability distributions for different images is calculated. The vectors, such as the eleven dimensional semantic color name, are compared. Any distance or similarity measure between histograms or vectors may be used. In one embodiment, the similarity measurement between two images is calculated as a Bhattacharyya coefficient.

Similarities are calculated for any other features. For example, the similarities between color histograms and texture histograms also use the Bhattacharyya coefficient. Different or the same similarity measures may be used for the different features.

The similarity of the covariance matrices is computed using any measure for difference or likeness of matrices. The covariance matrix does not lie in Euclidean space. For example, the distance between two covariance matrices may be computed as:

$$\rho(C_i, C_j) = \text{square root of } (\Sigma^5_{k=1} \lambda_k(C_i, C_j)) \qquad (6)$$

where $\lambda_k(C_i, C_j)$ are the generalized Eigen values of $C_i$ and $C_j$, computed from:

$$\lambda_k C_i x_k - C_j x_k = 0 \; k=1 \ldots 5 \qquad (7)$$

and $x_k \neq 0$ are generalized eigenvectors.

The similarity score, s, between two images based on a given local descriptor may be written as:

$$s_{i,j} = \rho_i(I_1(\lambda_i, r_i), I_2(\lambda_i, r_j)) \qquad (8)$$

where $\rho_i$ is the corresponding similarity measurement function of feature channel $\lambda_i$. Other representations of the similarity score between the same types of features may be used. The result is a feature vector of similarity scores for different types of features and different regions between two images of the same or different people.

In act 56, an affinity score is determined. The final matching affinity is represented as a combination of the corresponding similarity measurements of the local descriptors. Any combination may be used, such as a learnt, linear, non-linear, or other combination.

In one embodiment, the similarities are weighted for combination to determine the affinity score. The affinity score is a function of the similarity and a weight for each feature (e.g., each image descriptor). The weight indicates an importance of the particular similarity to the affinity. Some similarities are weighted more than others.

The relative weights are programmed or machine-learnt. For example, a machine-learnt classifier is trained before comparing images in actual use, such as days, weeks, months, or years before. A set of training data from different images is filtered or processed to obtain input features for the training. The training determines the most determinative features for a given classification and may discard lesser or non-determinative features. To prepare the set of training samples, ground truth is labeled or annotated (i.e., two images are or are not of the same person). Any number of expert annotated frames of data is used, such as hundreds or thousands. The training data may be a generic image set or may be taken from a region to be surveyed.

The weights are trained from the training data set using a computer. A data-driven, learning-based algorithm is applied to the training data. Using machine learning, the classifier is trained. The machine-trained classifier is any one or more classifiers. The classifier may be a model or detector using imaging processing, filtering, or other techniques. A single class or binary classifier, collection of different classifiers, cascaded classifiers, hierarchal classifier, multi-class classifier, model-based classifier, classifier based on machine learning, or combinations thereof may be used. Multi-class classifiers include CART, K-nearest neighbors, neural network (e.g., multi-layer perceptron), mixture models, or others. A probabilistic boosting tree may be used. Error-correcting output code (ECOC) may be used.

Once trained, a matrix is output. The matrix represents the learnt algorithm for weighting and/or for combining similarities. For application, the derived features from two images are input to the matrix. As an output, the matrix indicates the affinity score, such as a binary yes/no or a probability of being the same person. The output may also include probabilistic or other information, such as associated with alternative values.

In one embodiment, the weight is a rank-boosted machine-learnt value. The similarity scores are combined as a function of rank-boosted weights. The combination coefficient is learned from the training data using the RankBoost learning algorithm.

The appearance-based affinity model is treated as an ensemble of local descriptors and their corresponding similarity measurements. Any two images of people are input, and the model computes an affinity score as the output. The appearance-based affinity model is a linear combination of all similarity measurements as noted above for equation (8). The affinity model takes the form:

$$H(P_1, P_2) = \Sigma \alpha_{i,j} s_{i,j} \tag{9}$$

where the coefficients $\{\alpha\}$ represent the importance of local descriptors.

In the re-identification problem, the desired model has the goal of giving correct matches higher ranking than the incorrect ones. The re-identification problem is formatted as a ranking problem. Suppose there three person images $P_i$, $P_j$, and $P_k$, where $P_i$ and $P_j$ correspond to the same individual, while $P_k$ is a different individual. The ranking function, H, should prefer matching $P_i$ and $P_j$ more than $P_i$ and $P_k$. More formally, a model is trained such that $H(P_i, P_j) > H(P_i, P_k)$.

The instance set $X = P \times P$ is defined where P is the set of person images in the dataset. The ranking sample set is denoted by:

$$R = \{(x_{i,0}, x_{i,1} | x_{i,0} \text{ in the set of } X, x_{i,1} \text{ in the set of } X) \tag{10}$$

where $x_{i,0}$ and $x_{i,1}$ each represent a pair of person images, and $(x_{i,0}, x_{i,1})$ in the set R indicates that the association of $x_{i,1}$ should be ranked higher than $x_{i,0}$.

The loss function for boosting is represented as:

$$Z_t = \Sigma w_0(x_{i,0}, x_{i,1}) I(H(x_{i,0}) - H(x_{i,1})) \tag{11}$$

where I is a Boolean function and $w_0$ is the initial weight of each sample, which is updated during boosting. The goal is to find H(x) that minimizes Z. H is obtained by sequentially adding new weak rankers. In the t-th round, an optimal weak ranker $h_t: X \to R$ is found that minimizes:

$$Z_t = \Sigma w_t(x_{i,0}, x_{i,1}) I(h_t(x_{i,0}) - h_t(x_{i,1})) \tag{12}$$

Once the optimal ranker is found, the weight $\alpha_t$ is computed as:

$$\alpha_t = (\tfrac{1}{2}) \ln((1-r)/(1-r)), \quad r = \Sigma w_t(x_{i,0}, x_{i,1}) I(h_t(x_{i,0}) - h_t(x_{i,1})). \tag{13}$$

The sample weight is updated according to $h_t$ and $\alpha_t$ to emphasize difficult ranking samples. The final strong ranking classifier is the weighted combination of the selected weak ranking classifiers: $H(x) = \Sigma^n_{t=1} \alpha_t h_t(x)$, where n is the number of the boosting round.

Any boosting approach may be used. In one embodiment, HybridBoost is used. HybridBoost is represented as:

Input: ranking sample set $R = \{(x_{i,0}, x_{i,1} | x_{i,0}$ in the set of X, $x_{i,1}$ in the set of X)
1: Set $w_i = 1/|R|$
2: for t = 1 to T do
3:    Choose $k^* = \arg\min_k = \Sigma w_t(x_{i,0}, x_{i,1}) I(h_k(x_{i,0}) - h_k(x_{i,1}))$
4:    Set $h_t = h_{k^*}$
5:    Compute $\alpha_t$ as in Equation 0 (refeq:13)
6:    Update $w_i \leftarrow w_i \exp[\alpha_t(h_t(x_{i,0}) - h_t(x_{i,1}))]$
7:    Normalize $w_i$
8: end for
Output: $H(x) = \Sigma t_{t=1} \alpha_t h_t(x)$ The affinity score is a function of the similarities and weights for the various features (see equation 9). The similarities for the different types of image descriptors are weighted and combined. The weights for each type of feature are rank-boosted. Alternatively, only some of the weights are machine-learnt.

The affinity score is a function of the similarities and weights for the different regions. The similarities for the different sub-regions are weighted and combined. One or more sub-regions may not be used.

The combination is a linear sum. The similarities are weighted by a respective weight. The similarities are multiplied by the weights, but other functions may be used. The results are summed, but other functions may be used. The result of the summation may be normalized, such as divided by the number of similarities used.

In act 58, a person in an image is identified as being the same person as in another image. Act 58 is the same as act 46, but may be different. In act 58, the identification is based on the combination of similarity scores. The affinity score or other combination result is examined to determine whether a match occurred or not. If the affinity score is sufficiently high, low, or within a range, a match or re-identification is determined. Any thresholding scheme to resolve the similarities or combination of similarities to the binary determination of a same or different person may be used. A mapping or other function may be used to determine a match or determine no match.

FIG. 4 shows another method for re-identification from a feature set. FIG. 4 represents matching two person images with descriptor extraction in a joint classification using attributes. A person represented in one image is classified as the person represented in another image or not based on attributes. The classifying of the attributes is integrated with the classifying of the person in a joint classification. The classification of the attributes is handled separately but as part of the same joint classifier. By classifying one or more attributes of a person in the image, the attributes may be used to classify the person. By jointly classifying or integrating the attribute classification with the identification matching, a joint discriminative framework is provided. The attributes are weighted discriminatively in a unified framework for the attributes and identity of the person. The semantic attribute-based representation is integrated into the re-identification process. The interaction between attributes and identities is modeled in a joint discriminative framework. This integration may provide better accuracy than classifying attributes and using the output of these classifications as input features for a person classifier.

In act 60, the attributes and identities are jointly classified. Any joint classification approach may be used. Machine learning of joint classification may be provided. In one embodiment, a probabilistic log-linear model is used. The log-linear model is represented as:

$$P(y,m|x) = (1/(Z(x))\exp\{w^T\phi(x,y,m)\} \quad (14)$$

where x denotes the extracted feature vectors of two matched images, the variable y denotes the vector of attribute labels of the subjects in those two images and is similarly defined as $\{y_1, y_2\}$, while m is an indicator variable denoting whether the images are of the same person or not. The model learns the weight vector w given the feature representation of a training set of image pairs. The partition function Z(x) normalizes the joint probability distribution.

A maximum a-posteriori (MAP) inference is used similar to maximizing the joint linear cost function $w^T\phi(x, y, m)$. To make inference and learning tractable, the cost function is decomposed into potentials. Any potentials may be used, such as:

$$w^T\phi(x,y,m) = \alpha^T\phi^T(x_1,x_2,m) + \Sigma_{i\{1,2\}}\Sigma_\alpha \beta_\alpha^T \psi(x_i,y_{ai}) + \Sigma\gamma_\alpha^T\omega(y_{a1},y_{a2},m), \quad (15)$$

where $x_1$ and $x_2$ are the feature vectors for the first image and the second image, respectively. Similarly, $y_1$ and $y_2$ are the attribute label vectors for the first image and the second image, respectively.

In one embodiment, the joint classifier is trained as a support vector machine or other machine-learnt classifier, such as one of the classifiers discussed above for FIG. 3. In a support vector machine, a set of N training examples is provided where example k is denoted by $(x_k, y_k, m_k)$, representing the extracted features $x_k$ from an image pair, the ground truth attributes $y_k$ of the images, and whether the images are of the same person or not, $m_k$. The model parameters w are learnt by minimizing the regularized empirical loss functional:

$$\min_w((\lambda/2)(\|w\|^2) + (1/N)\Sigma_k^N L(x_k,y_k,m_k,w), \quad (16)$$

where the $L_2$ norm encourages a preference for simple models. To achieve the low generalization error of support vector machines, the empirical loss functional is set to the margin-maximizing structured hinge loss, represented as:

$$L(x_k,y_k,m_k,w) = \max_{y^\wedge,m^\wedge}[\Delta(y_k,y^\wedge,m_k,m^\wedge) + w^T\phi(x_k,y^\wedge,m^\wedge) - w^T\phi(x_k,y_k,m_k)] \quad (17)$$

where $\Delta(y, y^\wedge, m, m^\wedge)$ measures the loss incurred when predicting $y^\wedge$ and $m^\wedge$ instead of the ground truth labels. The loss decomposes over the individual variables as:

$$\Delta(y,y^\wedge,m,m^\wedge) = \delta(m,m^\wedge) + \lambda\Sigma_{i\{1,2\}}\Sigma_\alpha\delta(y_{ai},y^\wedge_{ai}) \quad (18)$$

This loss is typically set to the Hamming (or generally $L_0$) distance between the predicted labels and the ground truth labels.

For re-identification using attributes, the class distributions may be very imbalanced. This imbalance is natural as pants are typically long, not short; clothes are typically muted colors, not bright colors; people do not typically wear hats indoors; or other sources of imbalance. The Hamming distance is weighed by the inverse class frequencies to counter the imbalance. The hyper parameter A balances the contribution of the losses and is set to 1, but may be another value.

Learning the weight vector in a large scale setting may prove limiting, so a projected sub-gradient descent algorithm may be used. At each iteration, a sub-gradient of Equation (16) is computed as:

$$2\lambda w + (1/N)\Sigma_k^N(\phi(x_k,y^*_k,m^*_k) - \phi(x_k,y_k,m_k)) \quad (19)$$

where:

$$\{y^*_k,m^*_k\} = \arg\max \Delta(y,y^\wedge,m,m^\wedge) + w^T\phi(x_k,y^\wedge,m^\wedge) \quad (20)$$

Solving equation (20) is equivalent to performing loss-augmented MAP estimation. Given the structure of the model, this reduces to running belief propagation on a tree, which is exact and efficient. The sub-gradient may be computed in mini-batch (i.e., averaged over a small set of training examples).

Figure 5:
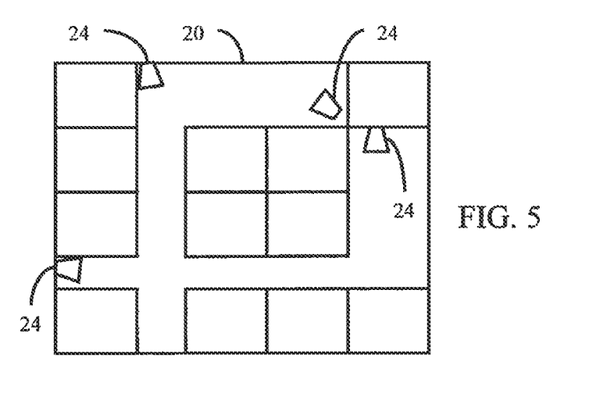
FIG. 5 illustrates an example arrangement of cameras.

In one example application represented in FIG. 5, a dataset is collected in an indoor office environment 20, such as using four different cameras 24 at varying angles and with variable lighting conditions. The data set contains any number of images and subjects, such as about 30,000 images of 330 different subjects. The images are generated by sampling images from several person trajectories obtained over a couple of hours of data. Since a person may appear several times over different tracks, the identities are manually annotated across tracks by visual inspection for training. Any number of attributes is annotated for each person, such as sixteen attributes (e.g., eleven attributes based on the clothing appearance (Sleeve Length, Pants Length, Hair Length, Top Color, Pants Color, Hair Color, Top Pattern, Gender, Facial Hair, Build, and Complexion) and five attributes for add-on/carried objects (Hat, Bag, Backpack, Handheld, and Glasses).

In act 62, one or more attributes of appearance of the person are classified. Any attributes characterizing the person, what the person is wearing, or what the person is carrying may be used. For example, sleeve length, pants length, hat, bag, and gender are classified. Additional, different, or fewer attributes may be used.

The attributes may be based on texture, pattern, color, shape, size (e.g., length) and/or context. For example, the color of specific clothing is used (e.g., brown pants). As another example, the length of specific clothing is used (e.g., short sleeve shirt). In yet another example, the size of an article is used (e.g., large verses small bag).

The attributes y are classified as a function of the features x. In attribute classification, a potential $\beta^T\psi(x_i,y_{ai})$ represents an attribute classifier for attribute a from each image $i\in\{1, 2\}$. The potential is defined as:

$$\beta^T\psi(x_i,y_{ai}) = \Sigma_{u(ya)}\beta^T_a x_i 1[y_{ai}=u] \quad (20)$$

where $y_a$ is the domain of attribute a, and 1[•] is the indicator function. This potential function is introduced for each image and for each attribute in the matching cost function. Other potential functions may be used.

Any features may be used. In one example, color histogram, texture histogram, and HOG features are used.

In act 64, the person in the image is classified as the same or different. The interaction between the attribute values for attribute a for both images and whether or not the images match is modeled by a potential. This attribute-matching consistency potential is represented as $\gamma^T_a\omega(y_{a1},y_{a2},m)$. The coupling between the three variables captures their interdependencies for attribute-consistent matching. The matching of the attributes between images for identifying the person is represented as:

$$\gamma^T_a\omega(y_{a1},y_{a2},m) = \Sigma_{u(ya)}\Sigma_{v(ya)}\gamma_{auvm}1[y_{a1}=u]1[y_{a2}=v] \quad (21)$$

where each $\gamma_{auvm}$ scores the joint likelihood of a match given labels u and v for attribute a. Learning this potential discriminatively allows penalization of mismatches differently. For example, a pink shirt may be mistaken for red, but not for blue. This ternary potential is introduced for each attribute in the cost function.

Other matching may be included. Non-attribute specific matching may be used. For example, the appearance or difference in appearance not specific to a given attribute is matched between the images. Gradient, Haar, filtering, or other features for the image or a sub-region of the image may be calculated and used for matching between images. For example, an appearance matching potential $\alpha^T \phi(x_1, x_2, m)$ is used. This potential is a standard linear binary classifier to predict whether or not the two images represent the same person given a joint feature representation, which is set to the difference between their feature vectors $(x_t - x_2)$. Other classification may be used.

Using the appearance and attributes determined from features, whether a person is the same in different images is classified. The learned weight vector w is a concatenation of the weight vectors of the individual potential functions [$\alpha$, $\beta$, $\gamma$]. The learned matrix receives the features as inputs, determines the attributes, and outputs whether a person is the same or not. The classification is a function of the attributes, but the values of the attributes may not be expressly calculated and/or output.

Alternatively, the values of the attributes are output. Outputting the attributes, with or without probabilities of the values of the attributes (e.g., 74% chance of female verses 26% chance of male), may be useful for purposes other than the classification for matching a person. For example, the attributes may be used for statistical analysis of populations being surveyed. The attributes may be used for searching, such as displaying images of all people wearing red hats or carrying a black bag.

The classification as a match of the person in two images or not is output as a binary indication. Alternatively, a probability or score is output. Thresholding or other functions are used to decide whether a same person has been re-identified or not.

Figure 6:
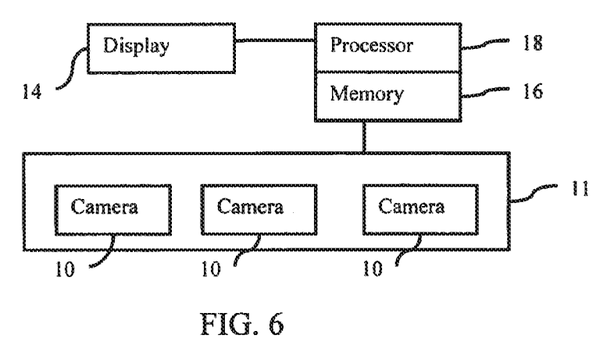
FIG. 6 is a block diagram of one embodiment of a system for person re-identification.

FIG. 6 shows a system for person re-identification. The system is a host computer, control station, work station, server, or other arrangement used for person re-identification. The system includes the display 14, memory 16, and processor 18. Additional, different, or fewer components may be provided.

The display 14, processor 18, and memory 16 may be part of a computer, server, or other system for image processing images from cameras 10 of the video surveillance system 11. A workstation or control station for the system 11 may be used. Alternatively, a separate or remote device not part of the video surveillance system 11 is used. Instead, the re-identification is performed remotely.

In one embodiment, the processor 18 and memory 16 are part of a server hosting the re-identification function for use by the surveillance system 11 as the client. The client and server are interconnected by a network, such as an intranet or the Internet. The client may be a computer of the video surveillance system 11, and the server may be provided by a manufacturer, provider, host, or creator of the video surveillance system 11.

The video surveillance system 11 includes a plurality of cameras 10. The cameras are distributed throughout a region, such as building, floor of a building, warehouse, campus, complex, outdoor region, arena, airport, transportation region, hub, city, or tunnel system. FIG. 5 shows one example. The cameras 10 are installed and connected to a communications network. Each camera 10 captures a scene of an area. The video cameras 10 may observe the Open Network Video Interface Forum (ONVIF) specification. The camera video streams are coupled to a video processing unit, which is coupled to a video store and to a video content analytics (VCA) module. The VCA module outputs time-stamped video data and metadata to their respective stores. The VCA module generates and outputs metadata in accordance with algorithms. The video and metadata stores may be implemented as digital video recorders (DVRs) or network video recorders (NVRs) for storage and replay. Video data is encoded and stored. The stream-based metadata may be stored with video. Other arrangements for video surveillance may be provided, such as regular capture of still images rather than video.

The display 14 is a CRT, LCD, projector, plasma, printer, smart phone or other now known or later developed display device for displaying the images, attributes, and/or re-identification information. For example, the display 14 displays two images, information about the camera locations for the images, and an indication of whether the same person is in both images. The display 14 assists in confirming matches or re-identification. Attribute information may be displayed as well.

The instructions, features, classifiers, matrices, outputs, color map, and/or other information are stored in a non-transitory computer readable memory, such as the memory 16. The memory 16 is an external storage device, RAM, ROM, database, and/or a local memory (e.g., solid state drive or hard drive). The same or different computer readable media may be used for the instructions and other data. The memory 16 may be implemented using a database management system (DBMS) managed by the processor 18 and residing on a memory, such as a hard disk, RAM, or removable media. Alternatively, the memory 16 is internal to the processor 18 (e.g. cache).

The instructions for implementing the processes, methods and/or techniques discussed herein are provided on non-transitory computer-readable storage media or memories, such as a cache, buffer, RAM, removable media, hard drive or other computer readable storage media (e.g., the memory 16). Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

A program may be uploaded to, and executed by, the processor 18 comprising any suitable architecture. Likewise, processing strategies may include multiprocessing, multitasking, parallel processing and the like. The processor 18 is implemented on a computer platform having hardware, such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 18 is one or more processors in a network.

The processor 18 may be implemented in various forms of hardware, software, firmware, special purpose processors, or a combination thereof. Some embodiments are implemented in software as a program tangibly embodied on a non-transitory program storage device.

The processor 18 is configured to obtain images. The images may be of a field of view or of a person clipped from the field of view. The processor 18 may perform the clipping. Regions or division of the image may be delineated by the processor 18.

The processor 18 is configured to extract features. For example, filtering, mapping, histogram creation or other acts are performed to determine values for the features. Any feature vectors are derived from the images to be compared.

The processor 18 is configured to classify based on the extracted features. The features are input to a matrix or matrices. The processor 18 determines an output of the machine-learnt classifier based on the input features. Other processing may be provided, such as calculating a function used by the classifier or calculating a function using the output of the classifier.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for person re-identification, the method comprising:
    mapping color values separately for different regions from first and second images to first and second probability distributions over a plurality of colors, the plurality of colors in a first color space different than a second color space of the color values;
    calculating separately, with a processor, for the different regions a similarity score between the first and second probability distributions;
    determining an affinity score as a function of the similarity scores from the different regions, and different weights applied to different similarity scores, the weight being a rank-boosted machine-learnt value; and
    identifying a person in the second image as a person in the first image, the identifying being a function of the affinity scores.

2. The method of claim 1 wherein the second color space comprises Red, Green, Blue (RGB) color space, wherein the first color space comprises color terms non subsumable into each other, and wherein mapping comprises mapping from RGB values to probabilities across the color terms.

3. The method of claim 1 wherein mapping comprises mapping to a semantic color name.

4. The method of claim 1 wherein mapping comprises assigning different probabilities to each of the colors for each of the color values, at least two of the probabilities being greater than 0.0.

5. The method of claim 1 wherein calculating comprises calculating between vectors representing the first and second probability distributions.

6. The method of claim 1 wherein calculating comprises calculating Bhattacharyya coefficients.

7. The method of claim 1 wherein determining the affinity score comprises linearly combining the similarity and additional similarities.

8. The method of claim 1 wherein identifying the person comprises comparing the affinity score to a threshold.

9. In a non-transitory computer readable storage medium having stored therein data representing instructions executable by a programmed processor for person re-identification, the storage medium comprising instructions for:
    obtaining a first image representing a person and at least a second image;
    computing probability distributions of a semantic color name of the first and second images;
    determining image descriptors of the first image and second image in addition to the probability distributions;
    calculating similarity scores of the probability distributions and the image descriptors;
    weighting the similarity scores with rank-boosted machine learnt weights;
    summing linearly the weighted similarity scores; and
    re-identifying the person in the second image as a function of the combination of the weighted similarity scores.

10. In a non-transitory computer readable storage medium having stored therein data representing instructions executable by a programmed processor for person re-identification, the storage medium comprising instructions for:
    obtaining a first image representing a person and at least a second image;
    computing probability distributions of the first and second images by mapping from a red, green, blue (RGB) color space to four or more colors in a semantic color name space; the probability distributions including probabilities less than 100%;
    determining image descriptors of the first image and second image in addition to the probability distributions;
    calculating similarity scores of the probability distributions and the image descriptors;
    combining the similarity scores as a function of rank-boosting weights; and
    re-identifying the person in the second image as a function of the combination of the similarity scores.

11. The non-transitory computer readable storage medium of claim 10 wherein combining comprises weighting the similarity scores with the rank-boosting weights, the rank-boosting weights comprising machine-learnt weights and linearly summing the weighted similarity scores.

12. The non-transitory computer readable storage medium of claim 10 wherein computing comprises mapping separately for different regions in the first and second images, wherein calculating comprises calculating a regional similarity score separately for the different regions and calculating the similarity score comprises determining as a function of the regional similarity scores with different weights applied to different regional similarity scores.

13. The non-transitory computer readable storage medium of claim 10 wherein calculating similarity scores of the probability distributions comprises calculating between vectors representing the probability distributions.

14. A method for person re-identification, the method comprising:
    mapping color values from first and second images to first and second probability distributions over a plurality of colors, the plurality of colors in a first color space different than a second color space of the color values;

calculating, with a processor, similarities between characteristics of the first and second images, the characteristics including a color histogram, a texture histogram, and a covariance matrix;

determining an affinity score as a function of the similarities and weights of the respective similarities, the weights being rank-boosted machine-learnt values; and identifying a person in the second image as a person in the first image, the identifying being a function of the affinity score.

* * * * *